United States Patent [19]

Weber

[11] 4,322,786
[45] Mar. 30, 1982

[54] PULSE BURST REGULATED D.C. POWER SUPPLY APPARATUS AND METHOD

[75] Inventor: Harold J. Weber, Sherborn, Mass.

[73] Assignee: Coulter Systems Corp., Bedford, Mass.

[21] Appl. No.: 174,804

[22] Filed: Aug. 4, 1980

[51] Int. Cl.³ .......................................... H02P 13/22
[52] U.S. Cl. .................................. 363/21; 355/3 CH; 355/14 CH; 361/235; 363/25
[58] Field of Search ............... 363/19, 20, 21, 25; 355/3 CH, 14 CH; 361/235

[56] References Cited

U.S. PATENT DOCUMENTS

| | | | |
|---|---|---|---|
| 2,854,615 | 9/1958 | Light | 363/19 |
| 3,229,158 | 1/1966 | Jensen | 363/25 |
| 3,986,085 | 10/1976 | Weber | 361/235 |
| 4,028,596 | 6/1977 | Weber | 363/20 |

Primary Examiner—William H. Beha, Jr.

[57] ABSTRACT

A power supply which serves as a power converter from a relatively low primary direct current energy source, to a generally higher value of secondary direct current power for application to an electric load element. The secondary power is voltage regulated. Regulation is provided by limiting the number of electric pulses of primary power produced by the converter to not more than the least total number of such pulses necessary to maintain the secondary voltage at its preferred average d.c. voltage level.

31 Claims, 8 Drawing Figures

PULSE BURST REGULATED D.C. POWER SUPPLY APPARATUS AND METHOD

BACKGROUND OF INVENTION

The requirement for relatively low cost d.c. converters exhibiting good efficiency finds varied application. One particular field in which such a power supply requirement arises is in that of electrophotography. In particular such application includes the generation of relatively low current potentials which are primarily electrostatic-field load dominated, such as for the bias of toner (in particular liquid toner) image formation electrodes. It is known art to bias such electrodes with certain values of electric potential on the order of ten volts or more which serves to provide for the controlled electrostatic precipitation of and then enhance the attachment of suspended charged toner particles to the affinitive charged regions on a coacting electrophotographic medium.

Yet another useful electrophotographic application for the instant invention is to develop the necessary image transfer bias potential essential to accomplish the effective transfer of toner particles situated on the image plane of an electrophotographic medium onto a separate support substrate, such as paper. The d.c. value of such electrostatic transfer voltages usually are on the order of several kilovolts.

Still another useful electrophotographic application is in the charging of energy storage capacitors used in electronic flash energy discharge illumination application. Through the improvement wrought by the instant invention, the charging and subsequent recharging of such a storage capacitor can be made substantially constant, providing more predictable illumination levels from the associated flash lamps.

SUMMARY

A power supply is described which serves as a power converter from a relatively low voltage primary direct current energy source, such as a battery, to a generally higher value of secondary direct current potential for application to an electric load element. The essence of the invention resides in the method by which the output voltage level is effectively regulated while maintaining a high degree of efficiency and low manufacturing cost.

Therefore, a purpose of the teaching is to show the efficient output regulation of a d.c. power converter.

Yet another purpose is to show how this regulation may be achieved in such a way that negligible d.c. power is drawn from the energy source when the converted output potential is on the high side of the predetermined output load required value.

Still another purpose is to instruct the use of a control scheme which will allow the efficient use of a magnetic transformer of inexpensive design without performance sacrifice.

Another intent guides the utilization of essential control feedback elements having a minimum of ancillary elements and drawing negligible power from the energy source.

While another intent is to teach a regulatory element which is responsive to any predetermined value of secondary value direct current from about 80% of the primary source value to any reasonable higher magnitude.

DESCRIPTION OF DRAWINGS

The invention is illustrated with four sheets of drawings including five figures, as.

DESCRIPTION OF THE INVENTION

Figure 1:
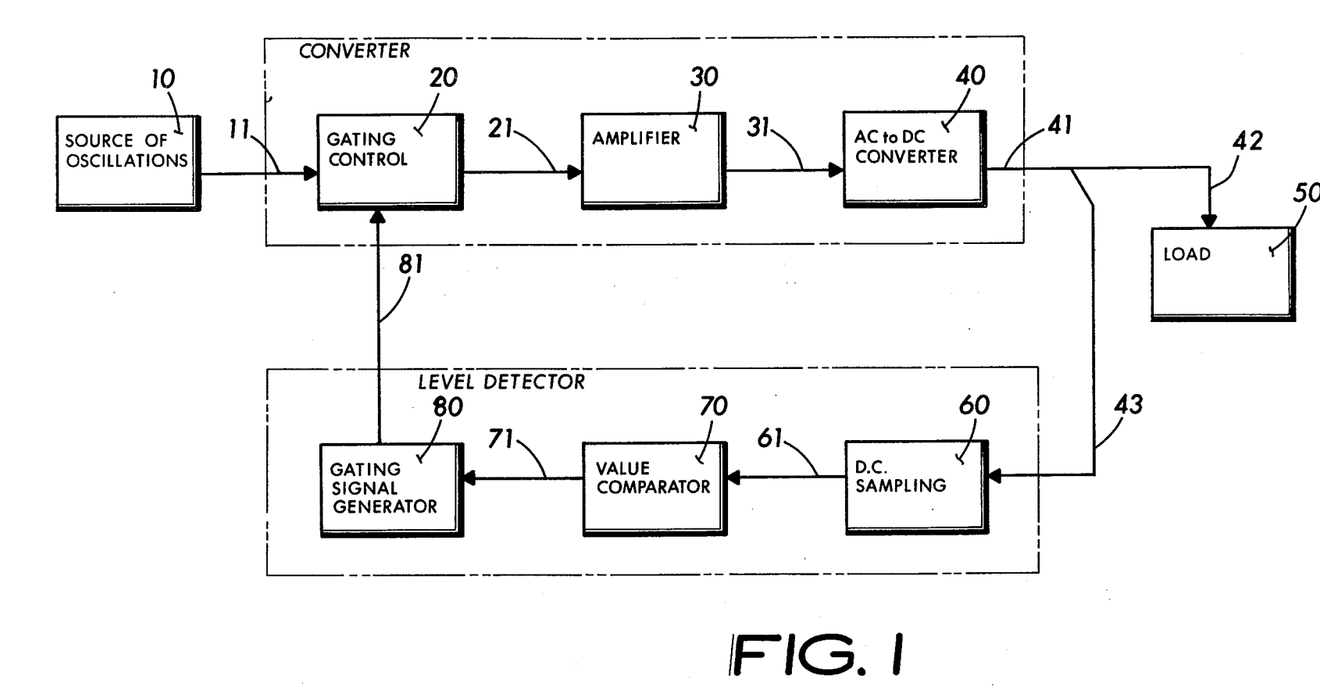
FIG. 1 Functional block diagram shows intercoupling of essential elements comprising invention.

FIG. 1 depicts the functional elements for the instant invention. A source of oscillations 10, such as a multivibrator or the like, acts to produce an alternating value electric pulse signal which couples 11 to the input of the gating control 20, which comprises part of the converter. These oscillations usually occur at a rate of several kilohertz and act to product an output 21 from the gating control 20 which couples to an amplifier 30. The amplitude of the oscillations are increased at the amplifier output 31 and usually connect to a transformer and rectifier arrangement which comprises the essence of the AC to DC converter 40 acting to adapt the alternating value pulses into a train of unipolar electric pulses. A d.c. output, 41 which is the resulting constant electric value developed by integrating the said electric pulses by a capacitor, serves to drive 42 the load 50. A part of the output 43 is also sampled 60 to produce a value signal 61 representative of the d.c. output value which couples to a value comparator 70. When this value signal 61 is below that of a defined level, an enable signal is produced on line 71 which gives rise to a gating signal 81 at the output of the gating signal generator 80 which enables the gating control function to pass the input oscillations 11 to the output 21. When the value signal 61 reaches a threshold value at the comparator 70 input, the comparator produces a disable signal on line 71 which effects the generator 80 to give rise to a gating signal 81 which will inhibit the oscillations 11 from reaching the gating control output 21. The AC to DC converter action stops and is not resumed for a finite period of time until the sampled level on lines 43 decreases below a threshold value on the line 61 input to the comparator. During this "off" period, energy is usually supplied to the load from the energy storage capacitor arrangement associated with the AC to DC converter 40 rectifier function.

What results is the gating control 20 passes, or else inhibits, short streams of oscillation signals in accord with the value developed across the load and thereby serves to hold the voltage across the load relatively constant.

Figure 2:
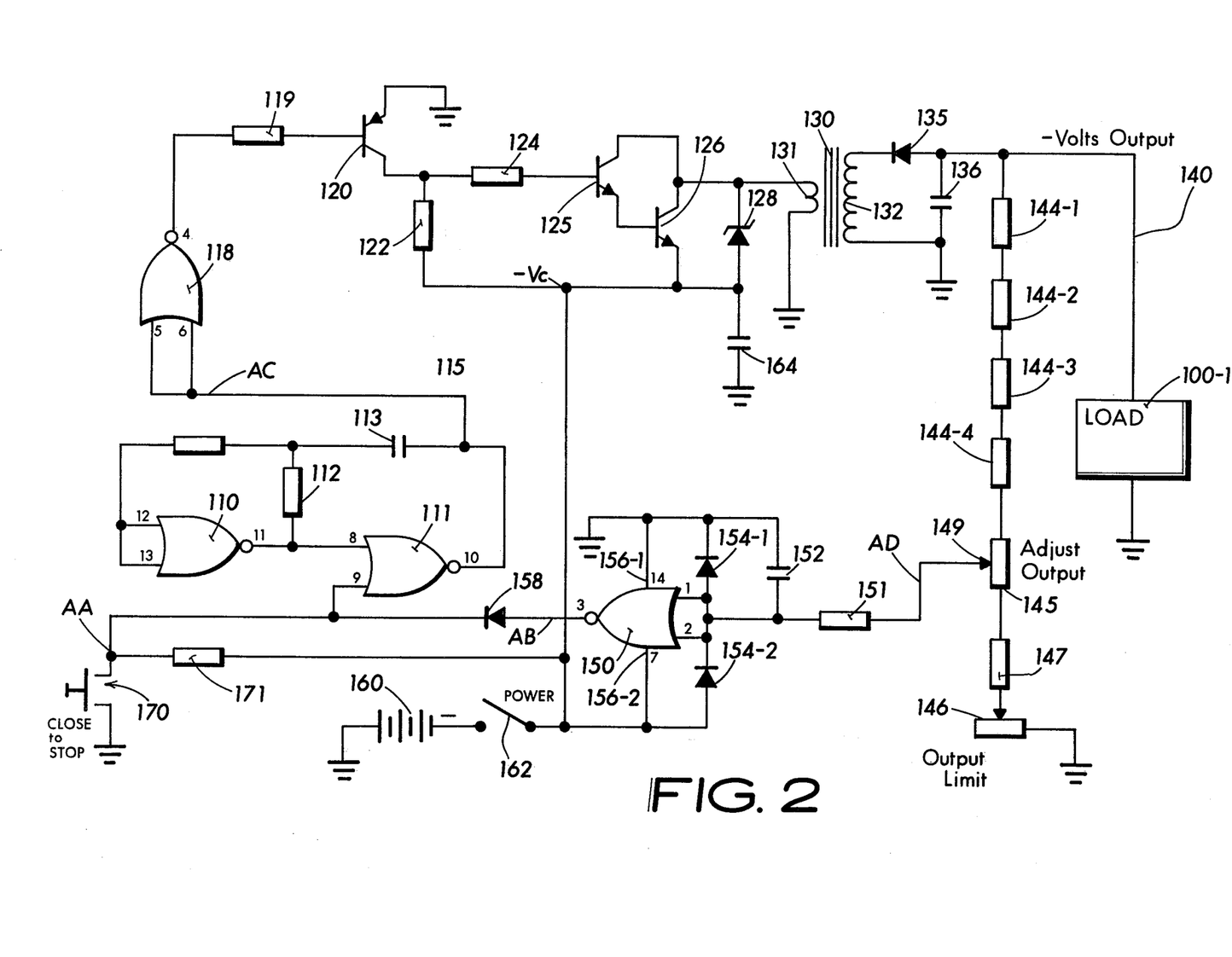
FIG. 2 Electrical diagram for a preferred embodiment producing a negative regulated output.

FIG. 2 depicts a preferred embodiment for a negative output power supply coupled to a load means 100-1.

Figures 6, 7, 8:
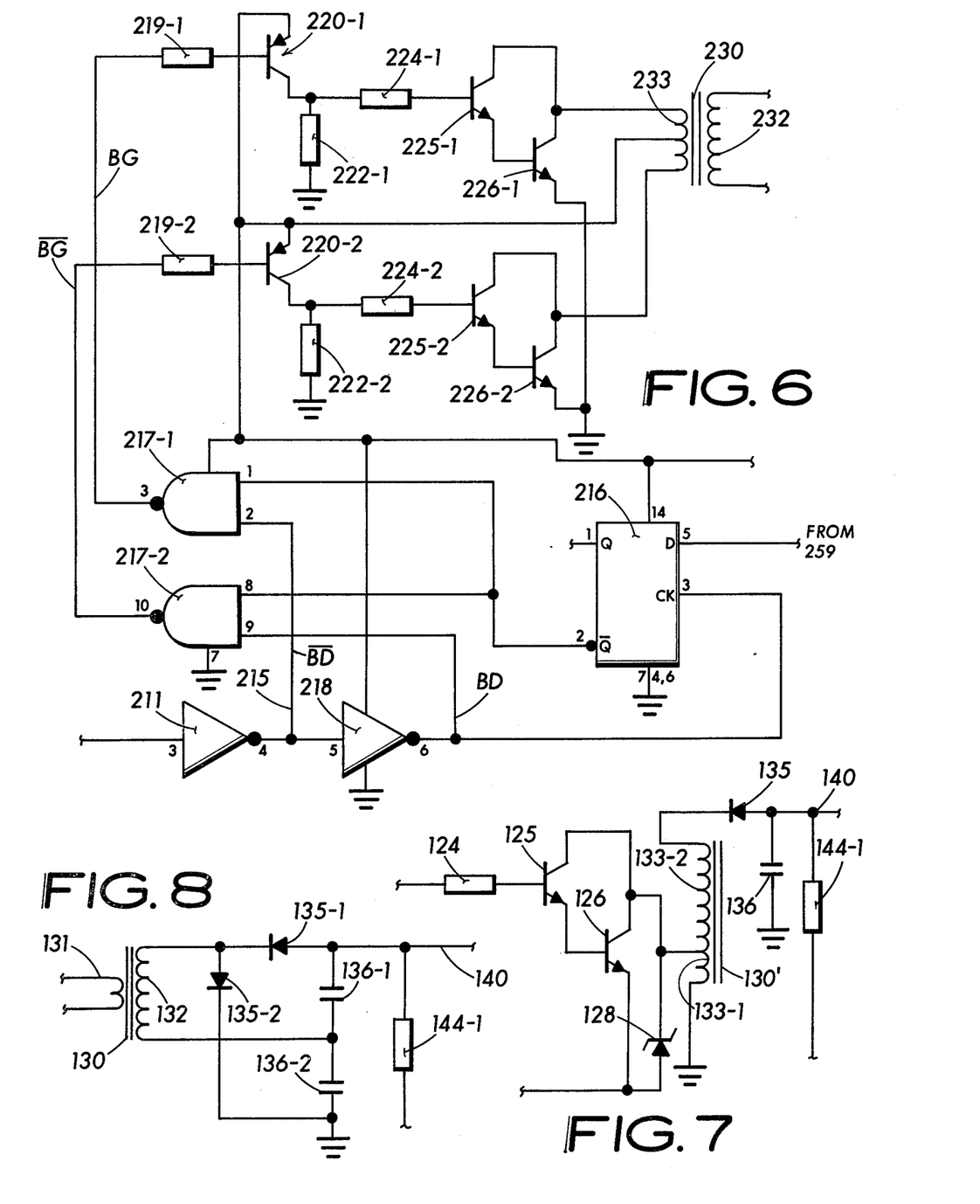
FIG. 6 Circuit adaptation from FIG. 4 for push-pull balanced transformer primary excitation.
FIG. 7 Circuit adaptation from FIG. 2 for auto transformer coupling.
FIG. 8 Circuit adaptation from FIG. 2 for voltage multiplier rectifier connection.

Such a power supply might find application as a corona charging power supply, or a toning or transfer bias power supply in electrophotographic camera apparatus. An oscillator, comprising an astable multivibrator arrangement including NOR gates 110, 111 together with the timing capacitor 113 and timing resistor 112, serves to produce a continuum of electric pulses on line 115. The pulses typically may have a repetition rate on the order of 5 to 6 kilohertz, by way of example. The oscillator operation is assured (with primary power applied) so long as switch 170 is open, enabling resistor 171 to draw the input pin 9 on the NOR gate to the negative source. Also, the output pin 3 of NOR gate 150 must be most negative, back biasing diode 158. The so-produced repetitive pulses on line 115 couple to inverter connected NOR gate 118, the inverted pulse signal output of which couples through resistor 119 to the base of PNP transistor 120. The transistor 120 acts as an inverting pulse amplifier which develops a replicate pulse signal across collector resistor, which in turn couples by way of current limiting resistor to the base of NPN transistor 125, which acts as a driver, in compound connection (i.e., Darlington connection) with power transistor 126. The pulses couple directly to the primary 131 of a step-up transformer 130. The primary current pulses coupled from the power transistor 126 serve to induce a usually higher voltage in the secondary 132 of the transformer. The induced secondary voltage is rectified by a diode means 135, which in the connection shown, serves to develop a negative potential across capacitor 136. With one particular embodiment a Triad type TY62A transformer was used. Whilst the transformer is an audio output type transformer, it serves well as an expedient 1:50 turns ratio step-up transformer, or induction coil, when the low impedance (e.g., voice coil winding) is used as the primary 131 and the high impedance (e.g., 10,000 ohm plate winding) is used as the secondary 132. In such a configuration, the $V_c$ supply is optimum at about 12 volts d.c., resulting in better than 700 volts being developed across a modest load 100-1 on the order of a few hundred microamperes. Of course the rectifier function 135 could be adapted, using well known circuit methods, to act as a doubler or multiplier through the inclusion of additional rectifier elements. FIG. 8 shows the circuit thus adapted as a voltage doubler where the diodes 135-1, 135-2 serve to rectify and capacitors 136-1, 136-2 serve to store the electric charges. The thereby developed "−volts output" 140 acts not only to supply the load 100-1, but also appears across a combined bleeder and voltage divider network including resistors 144-1 through 144-4, 147 together with potentiometer 145. The effect is that so long as the output 140 is low in value, the negative voltage developed on the arm 149 of the potentiometer 145 will be ground favored as it appears on the input of NOR gate 150 which, together with the other NOR gates 110, 111, 118 may form a C-MOS integrated circuit CD-4001A made by R.C.A. and others. The result, respecting the polarities involved, is that the gate 150 output will be negative, near $-V_c$ value, thereby serving to back bias diode 158 and enabling the aforesaid oscillator function. The connection of the designated gate 150 pin 14, which is the $+V_{cc}$ pin 156-1, couples to ground, while pin 7 which is the $-V_{bb}$ pin 156-2 connects to $-V_c$. This unusual connection satisfies the circuit power requirements but tends to reverse the circuit function sense. Resistor 151, together with capacitor 152 serve to gauge the response time of the circuit and together with clamp diodes (such as IN914) 154-1, 154-2 acts as a transient suppressor.

When the output high voltage 140 rises to a preestablished desired value, the voltage divider ratios are provided which produce a negative voltage sample value on the potentiometer arm 149 which is of sufficient value to induce transition of the NOR gate 150 whereby the output therefrom will be most near ground, which causes forward conduction of diode 158, such as a IN914, to in a like way pull pin 9 of the oscillator gate 111 to near ground. This polarity sense inhibits gate 111, stopping further oscillations and any continuation of rectified output 140 increase. In due course, the load 100-1 current together with the effective voltage divider bleeder current will drain the stored charge across capacitor 136 to a value low enough, as sampled on the potentiometer arm 149, that gate 150 will again reverse state and the recharging of storage capacitor 136 will resume. This on and off gating of the oscillator by the polarity state of gate 150 continues ad infinitum so long as the circuit is operative.

Figure 3:
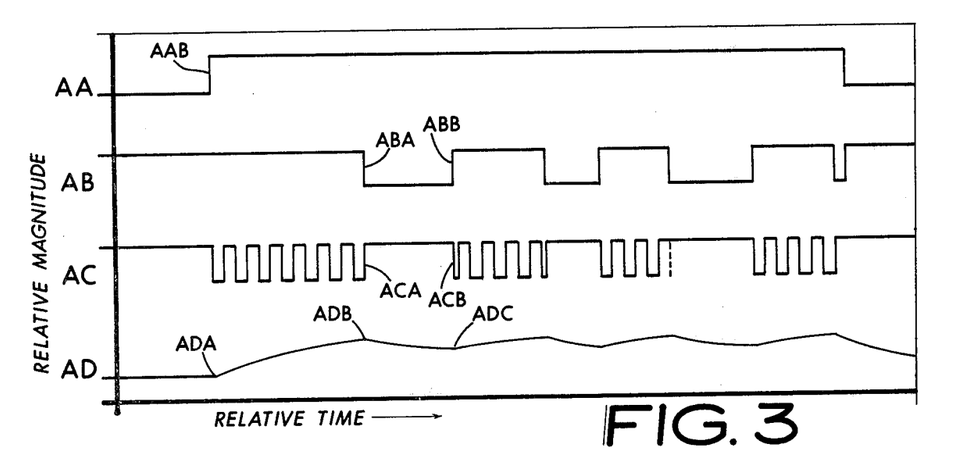
FIG. 3 Waveforms representative of the electric signals appearing at vital junctures shown in FIG. 2.

A timely reference to the waveforms of FIG. 3 will serve to relate the sequence of events which is so essential to the operation of the circuit styled after that of FIG. 2. When the circuit conditions are viewed by the waveforms, the "close to stop" switch 170 is viewed to have a position state which inhibits oscillation, which is shown by the LOW value prior to step AAB. This step represents the "opening" of switch 170 which allows the signal value to a HIGH, albeit negative, state which enables the NOR gate 111 and produces a signal AC on line 115. This signal AC is allowed to couple through amplifying states and a step-up transformer 130 to produce a "−Volts Output" value 140. This output also couples to a voltage divider network which, at the slider contact 149 of potentiometer 145, produces a ratioed voltage replicate of the d.c. output represented by multitudinous signal value variations AD. The build-up of the first voltage ramp coinncidentally commences ADA with the initiation signal AAB and rises to a threshold value ADB which causes the level sensing gate 150 to reverse state. The reversal of the gate 150 output signal AB is represented by transition ABA which jams any further oscillator signal production, indicated by change ACA. With the output voltage generation so inhibited, the output potential will decay in accord with the load demands, represented by the (about exponential) value characteristic between signal AD points ADB and ADC. When value ADC is reached, being the lower limit, the control gate 150 output AB will again reverse state ABB, giving rise to a renewed continuum of a bunch, or burst, of oscillator signal pulses ACB which will induce a further increase in the output ADC, with the up and down reversal of the charge and discharge state control signals continuing ad infinitum so long as the power supply is enabled, as by the switch 170 or other control means. This action also produces a continuum of bursts of oscillator signals of various numbers of component pulses.

Figure 4:
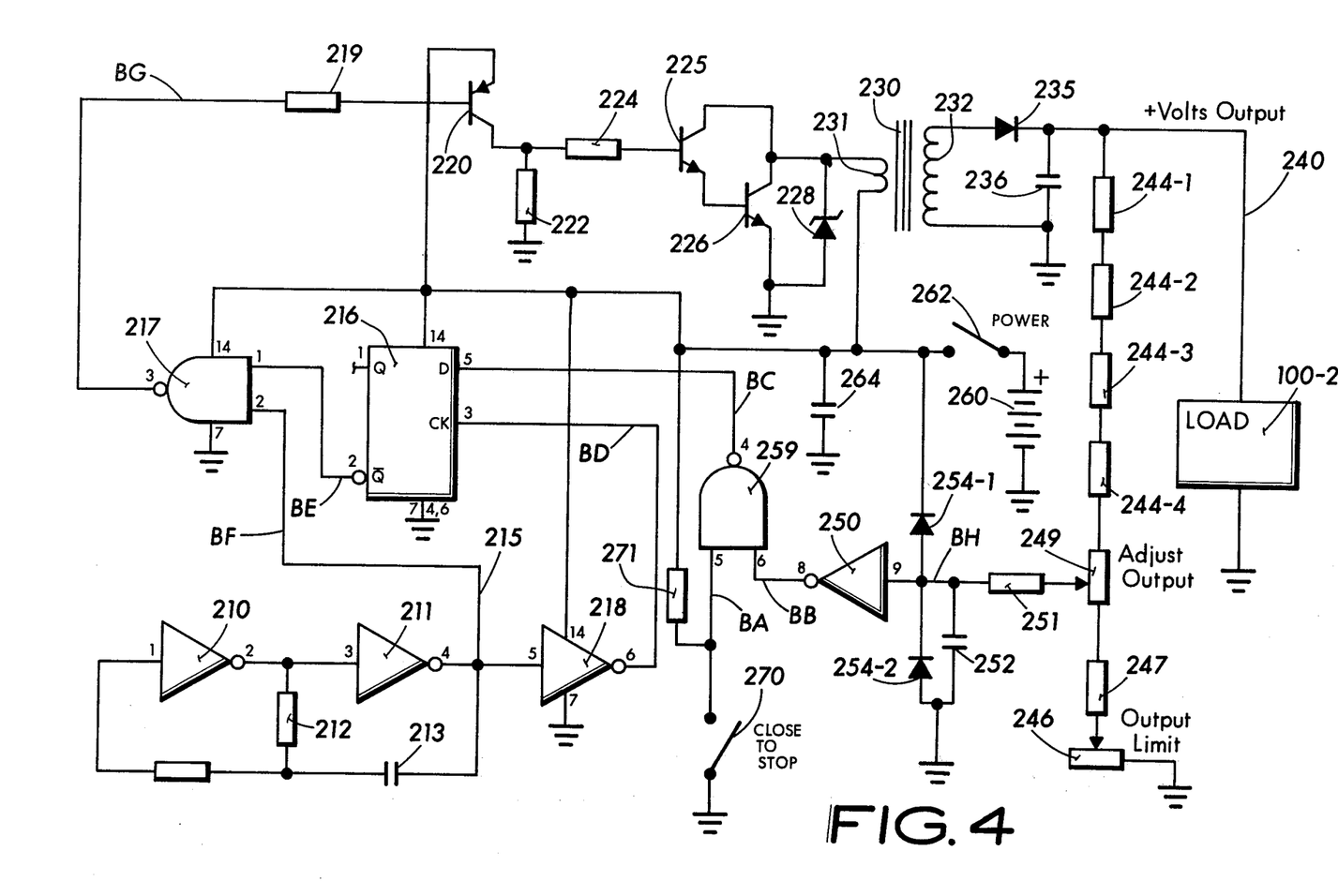
FIG. 4 Electrical diagram for a preferred embodiment producing a positive regulated output, having waveform improvement producing constant pulse duration transformer excitation.

Yet another preferred embodiment appears in FIG. 4. This variant form gives rise to two new conditions. It instructs one skilled in the art how to produce a positive output supply incorporating the essence of the invention and it, more importantly, gives rise to an enhancement of the waveform pulse signal bursts which reach the step-up transformer 230. With a transformer or ordinary design and in particular inexpensive transformers, impulse type pulses (e.g., pulses having waveform distortion in the form of being abbreviated in duration) may have a deleterious influence on the interlayer insulation margin of the transformer due to the phenomenon known as spiking, or the generation of transient potentials of unusual magnitude due to magnetic field collapse. This problem is minimal in a transformer of good, but also expensive, design and usually may be ignored. However, in low cost transformers and particularly high step-up ratio transformers, the parasitic conditions established by leakage inductance and other factors can reasonably be expected to compromise any normal safety factor in the insulation. The purpose of the showing of FIG. 4 is to provide an improvement in the control circuits for level regulation which will establish any individual pulse component of a train of pulses within a burst of oscillator pulses to be standardized and uniform in duration. How this is brought about may best be understood by viewing the astable multivibrator oscillator circuit, including inverter elements 210, 211 such as C-MOS type CD4069B integrated circuits together with timing resistor 212 and capacitor 213, as being capable of producing a burst of oscillator pulse signals BF in FIG. 5 on line 215. This signal is also inverted to produce a signal BD at the output of inverter 218, which couples to the CK (i.e., clock) input of a "D" flip-flop 216 such as a C-MOS type CD-4013A. Referring to waveform BA of FIG. 5, it is also shown that the "CLOSE TO STOP" switch 270 will be connected to ground, thereby inhibiting NAND gate 259, producing a logic HIGH on line BC which couples to the "D" (data) input of the flip-flop 216. The result is that the $\overline{Q}$ output BE will be driven logic LOW, which serves to inhibit the NAND gate 217. Under such condition, no signal pulses BF are passed to the output stages by way of line BG. The result is that no output value will be produced from the transformer and rectifier combination, therefore the sample voltage which will appear at the slider are 249 of potentiometer 245 as coupled to the inverter 250 input line BH by way of the compensation resistor 251 and capacitor 252 is relatively low. Therefore, the output line BB of the inverter 250 will be logic HIGH as coupled to NAND gate 259. When switch 270 is OPENED, resistor 271 will serve to pull-up the associated input of NAND gate 259: e.g., both lines BA and BB will be logic HIGH. See waveform detail BAA. The result is gate 259 is enabled, and the flip-flop data input line BC assumes a logic LOW state BCA. However, the Q output does not immediately change, but is delayed BEA until the next leading (positive) edge BDA of the pulse BD is coupled to the resistor CK input, whereupon the inverted state of the "D" input is transferred to the $\overline{Q}$ output BE. When BE does shift logic HIGH, the NAND gate, such as C-MOS CD4011A or CD4093B, will become active allowing the oscillator signals BF to pass BG through resistor 219 to the base of PNP transistor 220 with the turn-on leading edge BGA coincident with the clock edge BDA. The transistor serves to act as a pulse amplifier, which together with collector resistor 222 and base current limiting resistor 224 acts to drive the input base connection of a compound connected arrangement of NPN transistors 225, 226. The collector circuit of power transistor 226, together with freewheeling diode 228, drives the primary 231 of a transformer 230 which produces a higher secondary 232 voltage. The secondary voltage is rectified by diode element 235 and accumulates across charge holding capacitor 236 as a "+ volts output" value on line 240, which couples to the terminal load 100-2.

Figure 5:
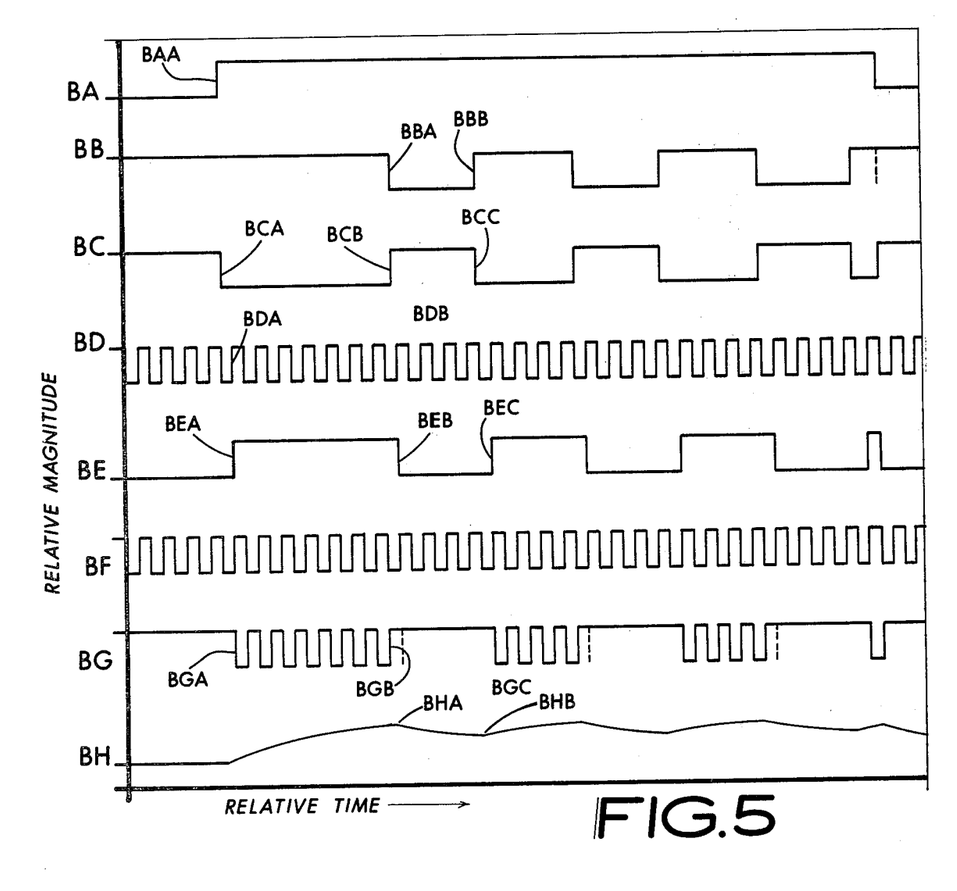
FIG. 5 Waveforms representative of the several essential electric signals found in the embodiment of FIG. 4.

A part of the output potential is sampled at the arm of potentiometer 245, which forms a voltage divider together with resistors 244-1 through 244-4, 246 and 247. As the "+ volts output" 240 increases, so will the arm 249 sample. A sample voltage level will finally be reached BHA which will produce sufficient electrical potential on the BH input line of digital inverter 250 to effect a control action. The inverter acts as a voltage sensor, with the switching action occurring at the device's $V_{IH}$ characteristic threshold value.

The result is the output of the inverter will go logic LOW BBA, inhibiting and gate 259 and producing a HIGH state on the flip-flop "D" input BC according to level shift BCB. On the very next clock positive going pulse edge BDB, the $\overline{Q}$ output will shift LOW BEB, inhibiting further pulse signal flow BG from the output of NAND gate 217. The transition edge shut off BGB will be synchronized with the clock edge BDB. The result is the d.c. output falls, due to load drain, until a lower value BHB, determined by the inverter's $V_{IL}$ threshold value is reached whereby the various waveform changes BBB, BCB, produce flip-flop control signals, which together with the CK (clock) signal BD will produce a synchronous waveform charge BEC on line BE which will re-allow the continuum of pulses BGC to reach the output driver stages. The action of the circuit is to on-and-off cycle the pulsing action of the transformer primary, so as to ensure a d.c. output after step-up and rectification which is load adapted so long as the operative state is maintained on control line BA.

The express advantage of this teaching is the efficiency which is attained without reverting to costly pulse shape controlled control methods, such as pulse width (or duty factor) regulators.

In the shown circuits, no significant power is consumed from the primary sources 160, 260 except when output demand exists. This is to say that when the output level is satisfied, however briefly, the primary source drain is stopped due to the inhibition of pulse drive signals AC and BG in the respective circuit examples. As such the PULSE BURST MODULATED control action does not draw more power pulses from the source than what the output power requirements demand. Furthermore, the constant pulse amplitude and pulse width enables the use of the low cost, but efficient, transformer designs which can serve to economize the design in manufacture. No critical elements are involved to attain good overall regulation performance. Regulation sensitivity is set in the main by the intrinsic gain of the comparator function offered by the inverter during the relatively linear $V_{IL}$ to $V_{IH}$ transition. In the preferred C-MOS integrated circuits, this gain is quite high. However, it must be recognized that the voltage level detector function afforded by inverters 150 and 250 may just as well be satisfied by a conventional voltage comparator or an operational amplifier, such as a CA3140, or even built up from discrete circuit elements including, for example, transistor gain blocks.

The effect of resistor 251, together with capacitor 252 is to provide input transient suppression together with diodes 254-1, 254-2. More importantly, the RC time constant provided by the resistor and capacitor creates some virtual operational hysteresis which slows down the stop and start action of the supply. In general the value of $$R_{251} \cdot C_{252} = (1/F_{CK})$$

where:
  $F_{CK}$ = oscillator signal frequency AC or BF in hertz
  R = megohms
  C = microfarads While the transformer 130 in FIG. 1, e.g., the referenced TY62A, does afford exampled performance for the invention's essence, it is obvious art to utilize any suitable transformer form that will satisfy the task at hand. For example, the inventor has found that a Ferroxcube type 2213P-3B7 cup core assembly works well with 5 turns of AWG26 magnet wire for the primary. Under a condition of 12 volts d.c. source voltage, and with a signal frequency of about 18 kilohertz, a secondary winding deposited on the core will produce about 1,000 volts peak-to-peak output with about 210 turns of AWG 44 wire on the secondary. Substantial improvement in transformer magnetic coupling efficiency can be provided through the use of a core material having a substantially rectangular hysteresis loop, and usually comprised of an alloy consisting of about 45 to 70 percent nickel and 55 to 30 percent iron, by volume.

FIG. 6 shows a further adaptation, wherein the transformer 230 primary 233 comprises about 10 turns, centertapped on the mentioned Ferroxcube assembly. In this variation, an alternate half cycle active pulse signal is coupled through gates 217-1, 217-2 to PNP transistors 220-1, 220-2 via base resistors 219-1, 219-2. The collector circuits of the PNP transistors, including pulldown resistors 222-1, 222-2 produce alternate phase pulse signals coupling to the Darlington connected transistors 225-1, 226-1 and 225-2, 226-2 through base resistors 224-1, 224-2. The result is push-pull excitation of the transformer 230 primary, yielding thereby more power output and a better, more cost effective utilization of the transformer materials.

While C-MOS type digital integrated circuits are illustratively employed to describe the invention, the practicing artisian may obviously adapt other logic elements to attain similar ends.

While the transformer described has a separate primary and secondary, a conventional autotransformer might just as well be used. FIG. 7 gives illustration of this, where the transformer 130' comprises a core and a single winding having two parts 133-1, 133-2. The first winding section 133-1 acts as the autotransformer primary, or excitation, winding. The second section 133-2 acts as the step-up, or secondary, winding with the voltage appearing at the juncture with diode 135 being the sum of the voltages appearing in the two winding sections.

The teaching may further be extended to operate at any reasonable alternating current periodicity rate between about 20 hertz where induction losses become significant to about 100 kilohertz where interwinding capacitance and other parasitic losses become unwieldly.

The extension of this teaching to any particular converter embodiment, other than that taught, is considered obvious as a variant thereof. Therefore, any known converter means having an oscillator the essential elements which are effectively independent from the transformer and satisfying the essence of the invention shall serve as an obvious alternative for the taught converter embodiment.

I claim:

1. Power supply method whereby an electric potential produced theroform is effectively made constant through the combination of:
   a. producing a continuum of alternating value electric pulses;
   b. adapting said pulses into a train of substantially unipolar electric pulse values;
   c. integrating said unipolar electric pulses into a substantially constant electric value;
   d. interrupting said continuum of alternating pulses when said constant electric value integratively increases above a predetermined level;
   e. recrudescing said continuum of alternating pulses when said constant electric value retrocedes substantially below said predetermined level, whereby further the active period of the first pulse comprising a train of successive pulses has a period at least equal to the corresponding period of any said successive pulse.

2. Power supply method of claim 1 whereby further the active period of the last pulse comprising a train of successive pulses has a period about equal to the corresponding period of any precedent pulse.

3. Power supply method of claim 1 whereby the succession of component pulses comprising said continuum of alternating pulses will each have an active period about equal to the corresponding period of any other component pulse.

4. Power supply method of claim 1 whereby said alternating value electric pulses are effectively produced through conversion from a direct current electric value.

5. Power supply of claim 1 wherein said constant electric value is adapted to provide a substantially direct current electric output signal having a value about that of the said predetermined level.

6. Power supply means whereby an electric potential is produced therefrom which is effectively made constant through the combination of:
   a. a source of electric oscillation signal;
   b. a converting means effectively coupled with said electric oscillation signal to produce therefrom a substantially constant unipolar electric value;
   c. a level detector means coupled with said converting means, therewith responsive to a predetermined level of said electric value; having a response signal output therefrom at least effective for producing a first response signal when said electric value increases above the predetermined level, and at least a second response signal when said electric value retrocedes below the predetermined value; and,
   d. gating means effectively coupled with said source, said converting means, and said level detection means; having an input adapted for receiving said response signals whereby when said first response signal eventuates, flow of said electric oscillation signal produced by said source will recede and when said second response signal eventuates said electric oscillation signal will arise, with the gating controlled to produce an effective oscillation signal wherein the active portion of the first pulse comprising a train of successive oscillation signal pulses so coupled has a duration at least equal to the corresponding duration of any said successive pulse.

7. Power supply means of claim 6 wherein said source of oscillations effectively includes an astable multivibrator.

8. Power supply means of claim 6 wherein said source of oscillations includes an effectively free-running blocking oscillator.

9. Power supply means of claim 6 wherein said converting means includes:
   a. amplifier means having an input thereto effectively coupled with said electric oscillations;
   b. transformer means effectively including at least a primary and a secondary, whereby said primary is effectively coupled with said amplifier means for receiving amplified said electric oscillations therefrom, responsive therewith to produce substantially bipolar electric oscillations from said secondary;
   c. a.c. to d.c. converter means coupled with said secondary, adapted for receiving bipolar electric oscillations therefrom and converting same into substantially unipolar electric pulse values; and,
   d. energy storage means coupled with said converter means, adapted for receiving unipolar electric pulses therefrom and collectively integrating a series of said pulses into a substantially constant electric value.

10. Power supply means of claim 9 wherein said amplifier means comprises transistor switch means.

11. Power supply means of claim 10 wherein said transistor switch means is push-pull.

12. Power supply means of claim 9 wherein said transformer means is an induction coil means.

13. Power supply means of claim 9 wherein said transformer means includes a primary winding and at least one substantially separate secondary winding, with essential coupling therebetween being effected by mutual induction.

14. Power supply means of claim 9 wherein said transformer means includes a primary winding and a secondary winding having substantially common origin, e.g. an autotransformer.

15. Power supply means of claim 9 wherein said ac. to d.c converter means includes semiconductor diode means adapted for rectifying said bipolar electric oscillations into substantially unipolar electric pulse values.

16. Power supply means of claim 9 wherein said a.c. to d.c. converter means is a rectifier device.

17. Power supply means of claim 9 wherein said a.c. to d.c. converter means includes an adaptation of rectifying elements in combination with a predetermined arrangement of capacitors, coupled with said transformer secondary, conjoined to act as a voltage multiplier to produce increased magnitude unipolar electric pulse values therefrom.

18. Power supply means of claim 9 wherein said energy storage means includes a capacitor coupled effectively between the converting means source connection for unipolar electric pulse values and the return connection thereto.

19. Power supply means of claim 9 wherein said energy storage means includes a capacitor effectively coupled with the a.c to d.c. converter means, adapted to receive unipolar electric pulse energy values as a charge therefrom, further effective for integratively accumulating said charge, producing therefrom a substantially constant electric value.

20. Power supply means of claim 6 wherein said level detector means includes a voltage comparator having an input thereto effectively coupled with said constant electric value further having an output adapted to produce a first response signal therefrom when said electric value is above a predetermined level and to alternatively produce a second response signal therefrom when said electric value is less than a predetermined level.

21. Power supply means of claim 6 wherein said level detector means includes a C-MOS logic element, whereby an effective voltage sample of the said constant electric value is coupled to the input thereof, whereby further said voltage sample coacts with said logic element's inherent "voltage transfer characteristic" and adapted to produce at an output therefrom a first response signal when said voltage sample is above the logic elements effective $V_{IH}$ "input HIGH voltage" level, and a second response signal when said voltage sample is less than the effective $V_{IL}$ "input LOW voltage" level.

22. Power supply means of claim 4 wherein said gating means substantially includes a combinational logic means having at least two inputs thereto and usually one output therefrom; whereby said electric oscillation signal is operatively coupled to one input thereto; said level detector response signal is operatively coupled with another input thereto; whereupon when a said first response signal is coupled therewith substantially no electric oscillation signal will appear at the output thereof; and whereupon further when a said second response signal is coupled therewith, a substantially replicate electric oscillation signal will appear at the output thereof whereby further the active period of the first pulse comprising a train of said replicate oscillations has a period at least equal to the corresponding period of any successive electric oscillation signal component pulse.

23. Power supply means of claim 5 wherein said gating means is effective to DISABLE said astable multivibrator in the presence of a first response signal and to ENABLE said astable multivibrator in the presence of a second response signal, whereby further when ENABLED said astable multivibrator produces a first pulse having an active period which is at least equal to the corresponding period of any successive pulses produced thereby.

24. Power supply means of claim 6 wherein said gating means is effective to DISABLE said blocking oscillator in the presence of a first response and to ENABLE said blocking oscillator in the presence of a second response signal, whereby further when ENABLED said blocking oscillator produces a first pulse having an active period which is at least equal to the corresponding period of any successive pulses produced thereby.

25. Power supply means of claim 4 whereby said gating means includes electric switch means efficacious to synchronously DISABLE the effective flow of electric oscillation signals in the presence of a first response signal; and further to synchronously ENABLE the effective flow of electric oscillation signal in the presence of a second response signal, whereby the succession of component pulses comprising said electric oscillation signal will each have an active period about equal to the corresponding period of any other component pulse.

26. Power supply means of claim 6 particularly adapted as a source of constant electric potential effective for the electrostatic, albeit corona discharge, charging of an electrophotographic imaging medium.

27. Power supply means of claim 6 whereby said electric oscillation signal recurs with a periodicity between about 20 hertz and 100 kilohertz.

28. Power supply means of claim 9 wherein said transformer means includes a core material having a substantially rectangular hysteresis loop, comprised of about 45 to 70 percent nickel and 55 to 30 percent iron, by volume.

29. Power supply means of claim 22 wherein the active period of the last pulse comprising a train of said replicate oscillations has a period about equal to the corresponding period of any precedent electric oscillation signal component pulse.

30. Power supply means of claim 23 whereby when said first response signal is produced, said gating means coacts with said astable multivibrator to DISABLE same upon completion of prevailing last pulse active period to thereby produce a last pulse active period which is about equal to the corresponding period of any precedent electric oscillation signal component produced thereby.

31. Power supply means of claim 24 wherein when said first response signal is produced, said gating means coacts with said blocking oscillator to DISABLE same upon completion of any prevailing last pulse active period to thereby produce a last pulse active period which is about equal to the corresponding period of any precedent electric oscillation signal component pulse produced thereby.

* * * * *